Jan. 30, 1968  A. W. ROCKWELL, JR., ET AL  3,365,737
SHOE LASTING MACHINES
Filed Oct. 18, 1965  9 Sheets-Sheet 1

Inventors
Adelbert W. Rockwell Jr.
John A. Meuse
By their Attorney
Everett D. Litchfield

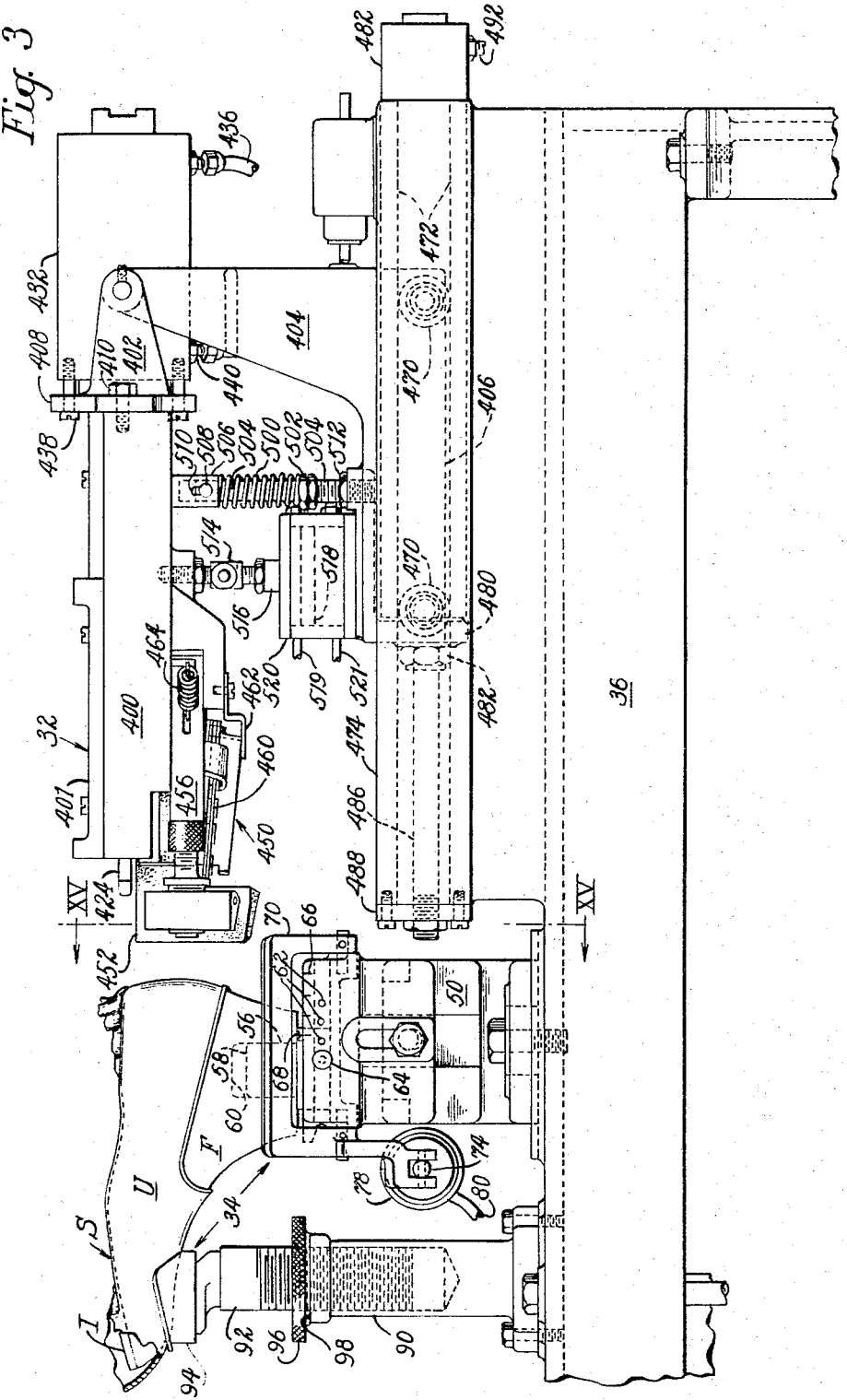

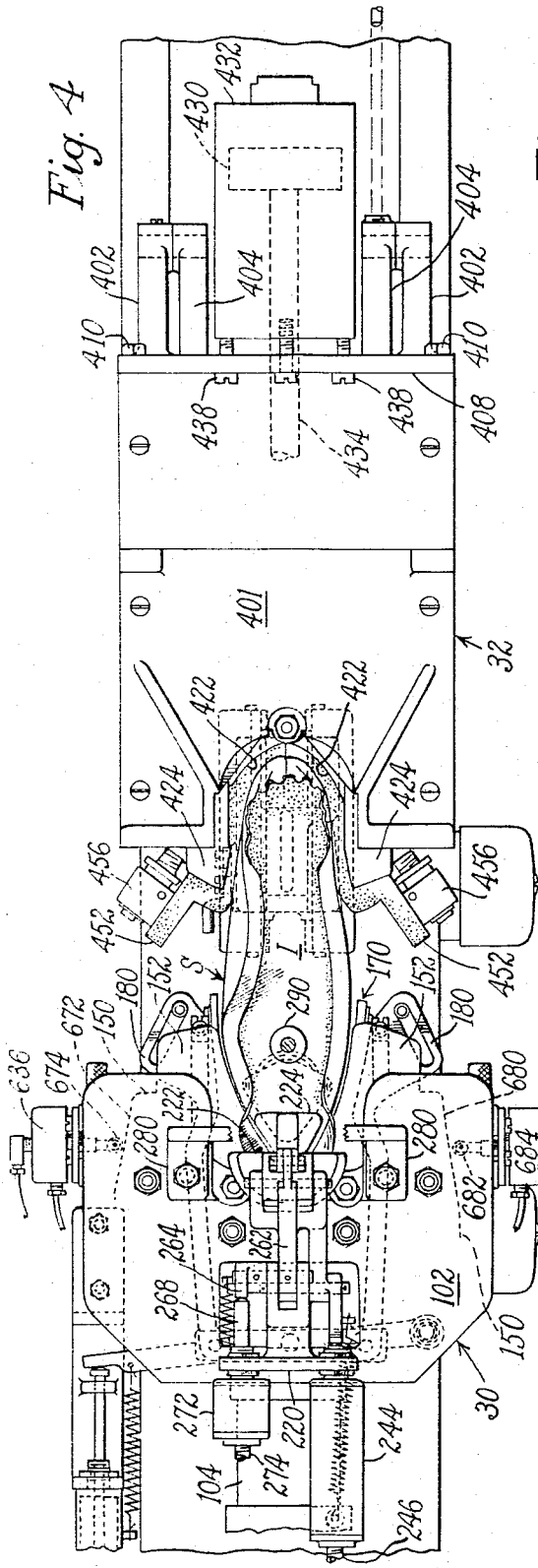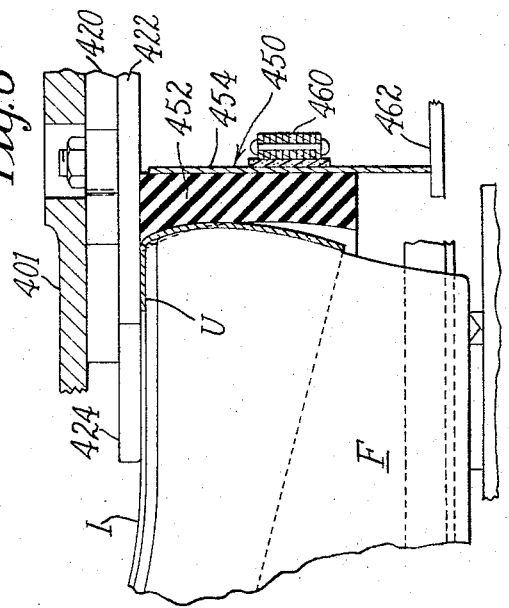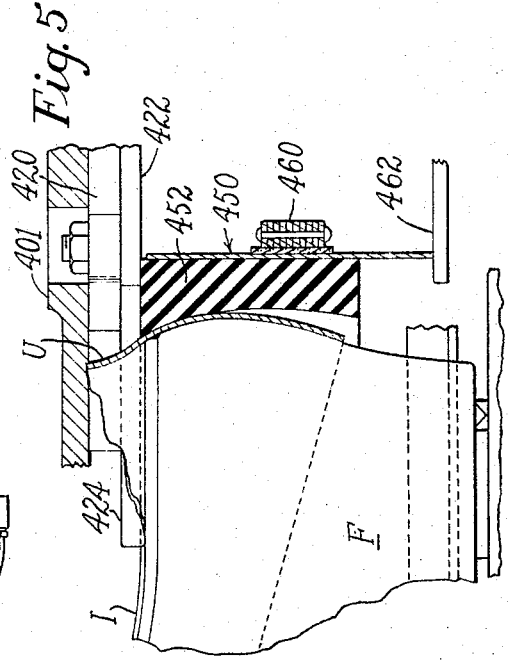

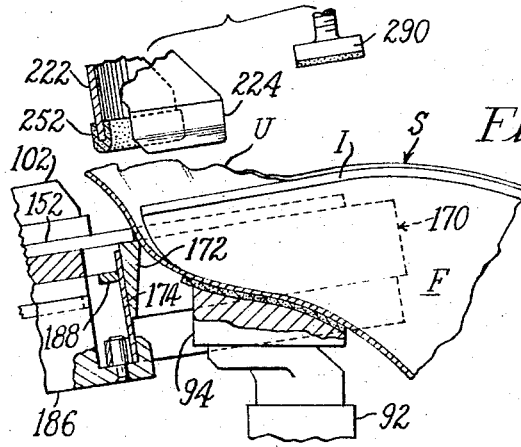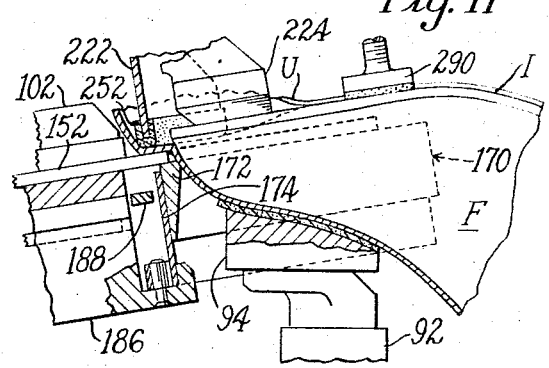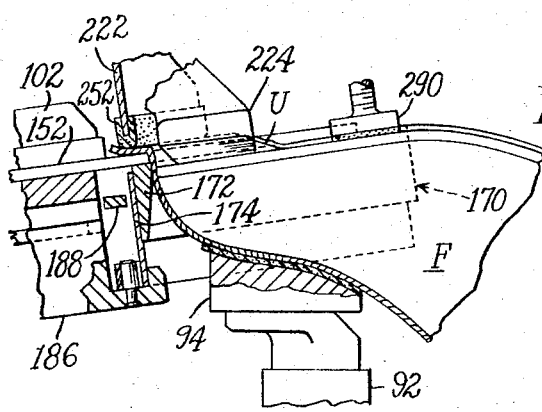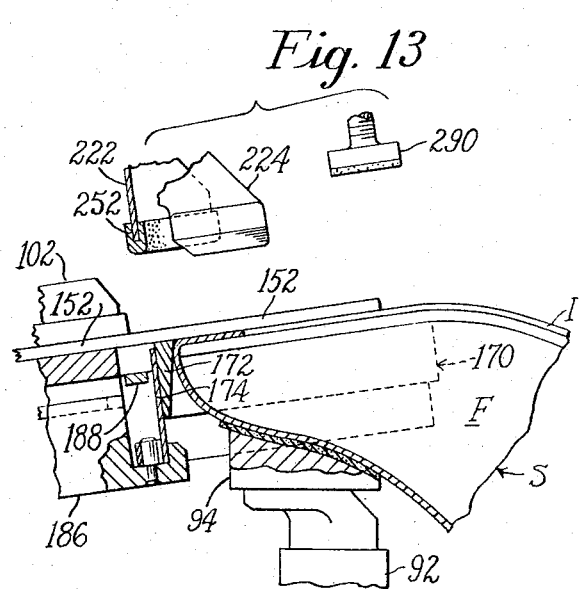

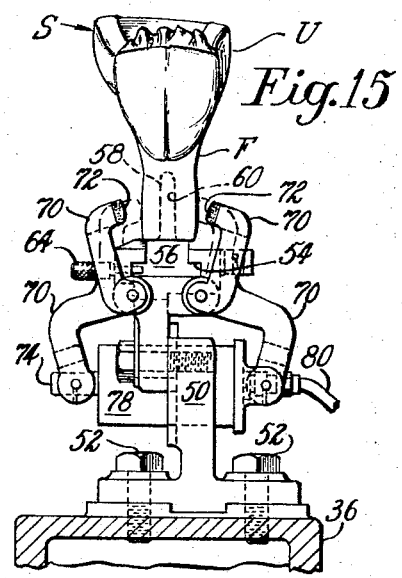
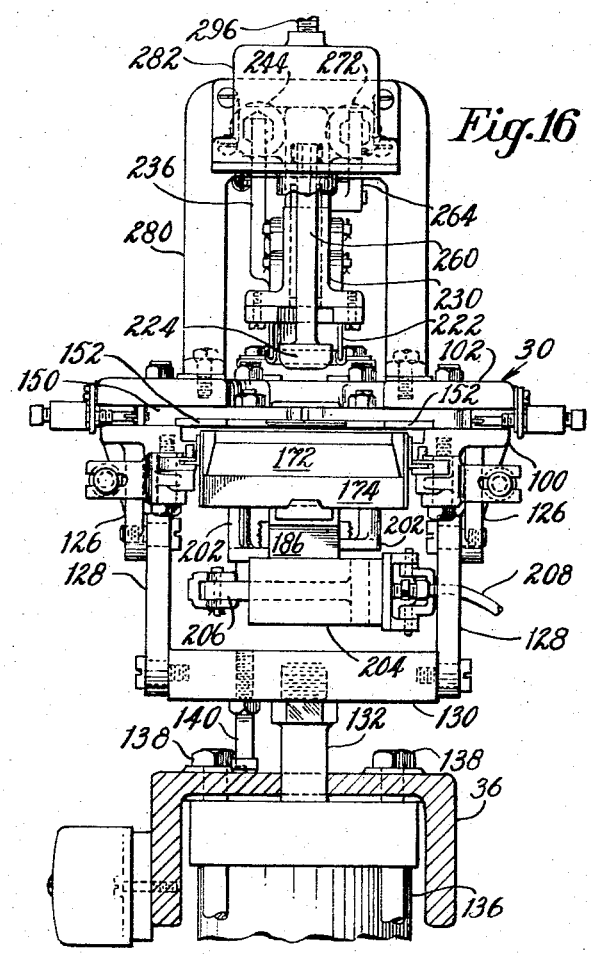

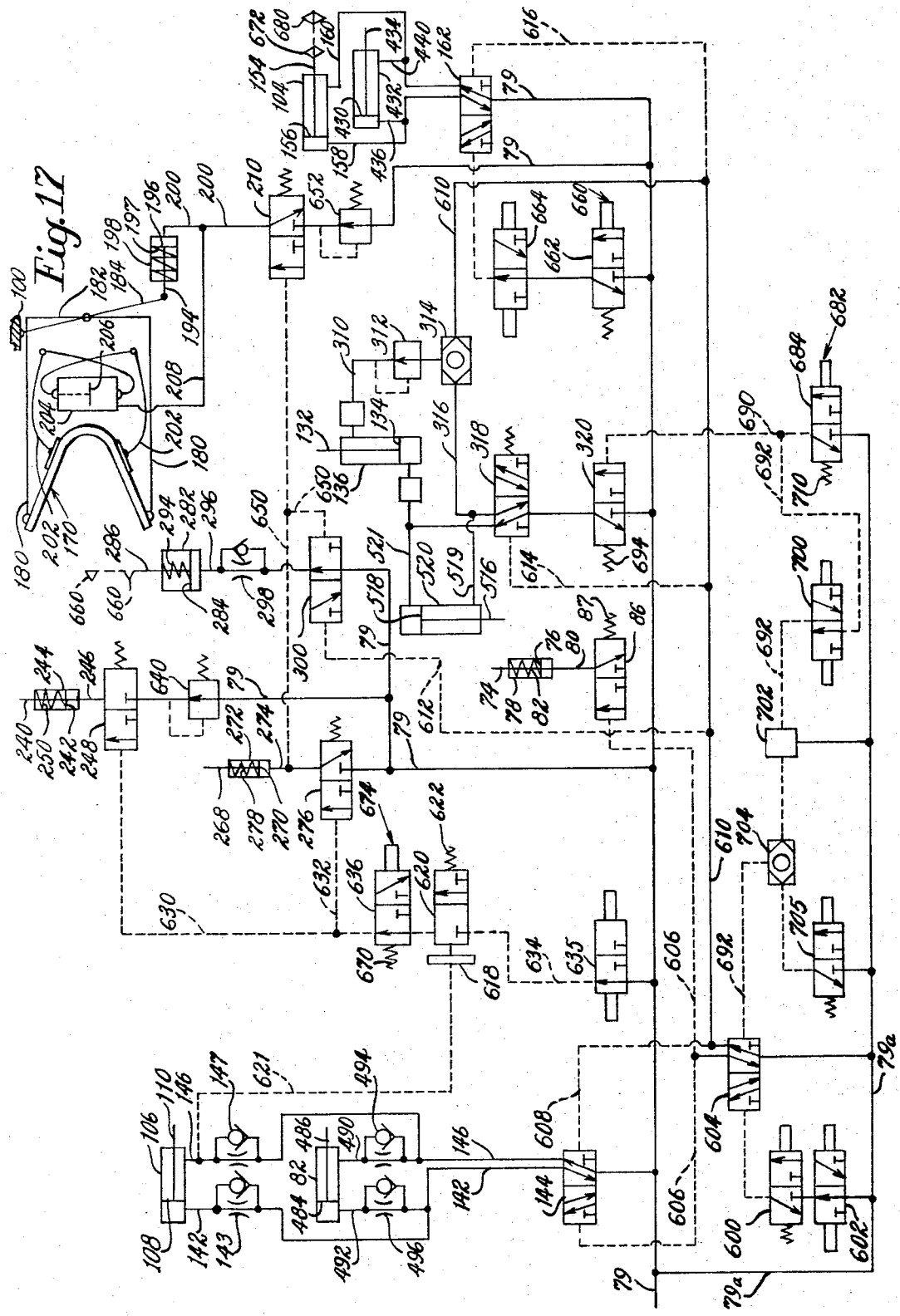

United States Patent Office 3,365,737
Patented Jan. 30, 1968

3,365,737
SHOE LASTING MACHINES
Adelbert W. Rockwell, Jr., Gloucester, and John A.
Meuse, Everett, Mass., assignors to United Shoe Machinery Corporation, Flemington, N.J., a corporation of New Jersey
Filed Oct. 18, 1965, Ser. No. 496,854
18 Claims. (Cl. 12—8.8)

ABSTRACT OF THE DISCLOSURE

A shoe lasting machine having a shoe positioning support, end lasting units movable relative to the support from remote positions into operating positions, a manually operable member with associated elements controlling power means moving and operating the units with a plunger engaging the shoe bottom and effecting unit operation.

---

This invention relates to shoe lasting machines and particularly to a novel and improved machine for lasting the opposite end portions of a shoe. As herein illustrated, the invention is shown as embodied in a machine especially adapted for lasting the opposite end portions of shoes having cloth uppers which are secured to the insoles by cement. It will be understood, however, that in their broader aspects the features of the invention are not limited to embodiment in machines for lasting this particular kind of a shoe or to the exact mechanical arrangement herein illustrated.

In the manufacture of shoes having cloth uppers which are secured to their insoles by cement, e.g., so-called tennis shoes, the cloth upper is assembled, together with an insole previously coated on one side with a tacky adhesive, on a metallic shoe form by one operator who, after properly positioning the upper relatively to the form, draws it toe-wardly to set it on the heel end of the form and then upwardly in the vicinity of its forepart, finally laying the lasting margin of the upper along the opposite side portions of the shoe inwardly over and manually pressing the lasting margin firmly against the tacky surface of the insole, thus effectively securing the lasting margin to the insole in lasted position. This side lasted shoe on its metal form is now presented to another operator who completes the lasting operation by means of a simplified bed type lasting machine in which the lasting margin of the upper is wiped inwardly over and then pressed against the tacky surface of the insole, first at one end of the shoe and then at the other end. This toe and heel lasting operation requires considerable skill and a fair degree of labor on the part of the operator of the bed type lasting machine and, inasmuch as the toe and heel lasting operations are performed separately, the procedure involves a maximum amount of time.

It is a principal object of this invention to provide a novel and improved machine for performing the toe and heel lasting operations on shoes of the above-mentioned type which, while requiring a very minimum amount of skill and labor on the part of the operator, provides superior as well as uniform toe and heel lasting at a greatly increased output rate.

With this object in view and in accordance with features of the invention, the herein illustrated machine which has a main frame construction is provided with a support for a shoe, comprising an upper and an insole assembled on a form, which support is adapted to position the toe end of a shoe in a predetermined location relatively to the frame, a toe lasting unit mounted on the frame for movement between a retracted position remote from the toe end of the shoe to a predetermined operative position adjacent to the toe end of the shoe, and a heel lasting unit mounted on the frame for movement between a retracted position remote from the heel end of the shoe to an operative position adjacent to the heel end of the shoe, together with power means for effecting such movements and for operating the toe and heel lasting units and means for controlling the operation of the power means including a control member and associated control elements adapted, upon actuation of the control member, for example by the operator, to cause the toe and heel lasting units to move to their operative positions and then to operate on the toe and heel ends of the shoe. More particularly, the shoe support is manually adjustable to position the toe ends of shoes of different sizes in the same predetermined location relative to the frame. Associated with the support is a power operated means for clamping the form to the support. The toe lasting unit includes a toe band for shaping the upper materials at the toe end of the shoe and wipers for thereafter wiping the lasting margin of the upper materials inwardly over and for pressing it against the toe end of the insole. The heel lasting unit includes heel seat wipers and a heel embracing band, power operated means being provided for effecting movement of the toe and heel lasting units to and from their operative positions and also for operating these units together with means for so controlling the operation of the several power operated means that in response to actuation of the aforementioned control member first the clamping means is caused to clamp the shoe form to the support. The toe lasting unit is next caused to move from its retracted position to its operative position and the heel seat lasting unit is caused to move from its retracted position to its operative position with the heel band embracing the heel end of the shoe. The toe and heel lasting units are then caused to operate on the toe and heel ends of the shoe and lastly the toe and heel lasting units are caused to return to their retracted positions and the clamping means is caused to release the shoe and its form for removal from the shoe support by the operator. Thus, with this novel construction and arrangement, all the operator has to do is to adjust the shoe support on the frame for the particular size of shoe to be lasted, place the side lasted shoe and its form on the shoe support and then actuate the manually operable control member. The lasting of the toe and heel ends of the shoe now is effected automatically and simultaneously without any further attention on the part of the operator who merely removes the completely lasted shoe and repeats the operation.

In the herein illustrated machine, the toe band of the toe lasting unit operates in response to heightwise movement relative to the toe end of a shoe on the support thus to shape the upper at the toe end of the shoe. To facilitate such relative heightwise movement and at the same time to avoid any tendency of the toe end of the shoe to be lifted away from the toe rest, the herein illustrated machine, in accordance with another feature of the invention, is provided with means for engaging the bottom of the forepart of the shoe above the toe rest and effecting, by a downward thrust thereon, heightwise movement of the toe lasting unit together with the toe band relatively to the toe end of the shoe. More particularly, the aforementioned means comprises a fluid pressure operated plunger having a predetermined stroke to elevate the toe lasting unit and bring the wipers into the proper heightwise relation with the bottom of the toe end of the shoe for the overwiping operation.

The above and other objects and features of the invention will appear in the following detailed description of the preferred embodiment illustrated in the accompanying drawings and will be pointed out in the claims.

In the drawings:

FIG. 3 is a view in side elevation, and on the enlarged scale of FIG. 2, showing the heel lasting head of the machine;

FIG. 4 is a plan view of the machine showing both the toe lasting head and the heel lasting head;

FIGS. 5 and 6 are detail views, with some parts in vertical section, showing certain of the operating elements of the heel lasting head in two different positions assumed during the operation of the machine;

FIGS. 10, 11, 12 and 13 are schematic views showing the several operating elements of the toe lasting head in different positions assumed during operation to last the toe end of a shoe.

FIG. 15 is a view in end elevation of the work supporting and clamping mechanism of the machine as viewed from the plane indicated by the line XV—XV in FIG. 3;

FIG. 16 is a view in end elevation of the toe lasting head as viewed from the plane indicated by the line XVI—XVI in FIG. 2, and FIG. 17 is a diagram of the fluid pressure operating system of the machine.

Figure 1:
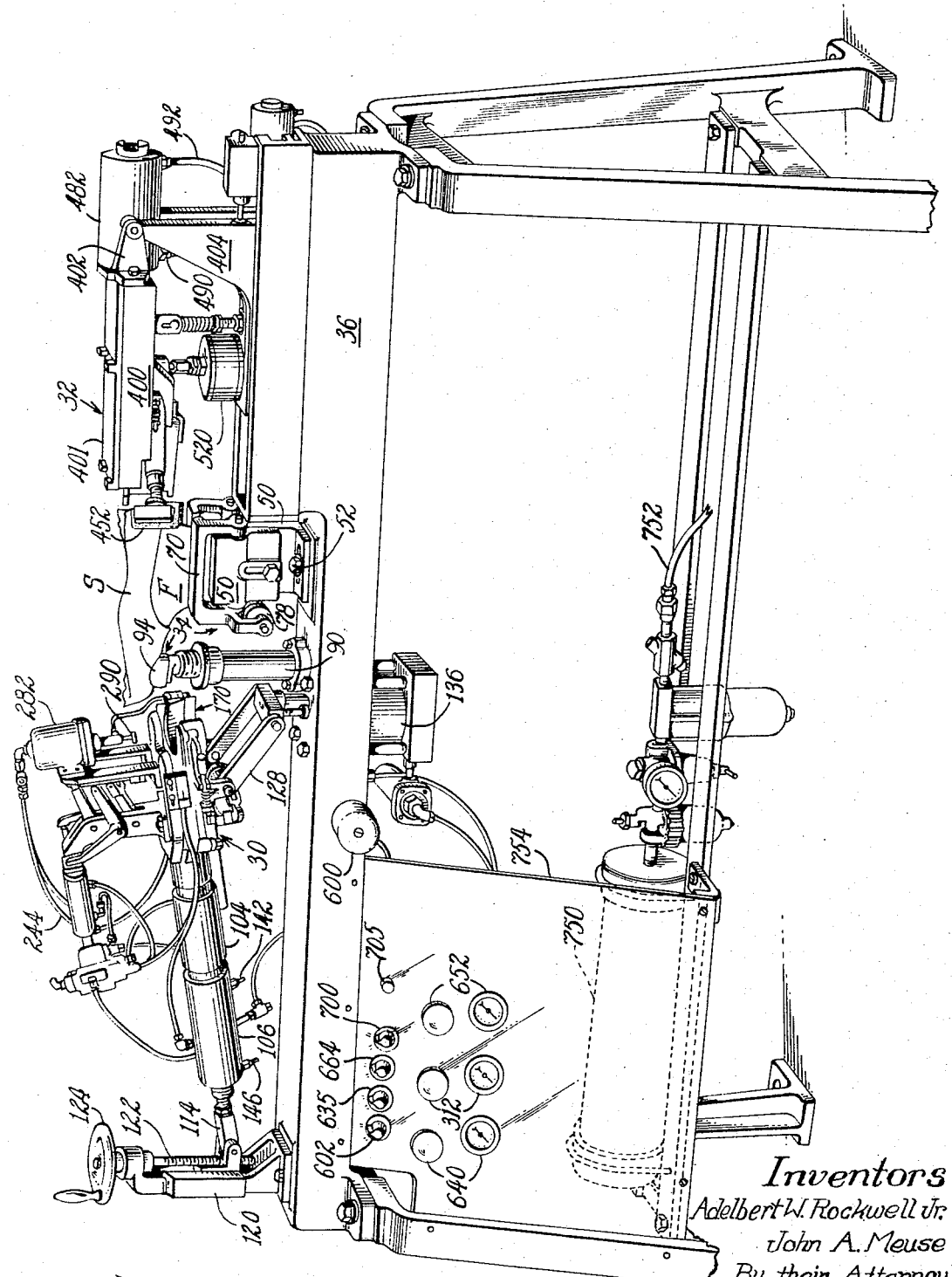
FIG. 1 is a perspective view, generally in side elevation, of a toe lasting machine embodying the features of this invention.

Referring to these drawings, and especially FIGS. 1–4 thereof, the herein illustrated machine comprises a toe lasting head, indicated generally by the reference character 30, a heel lasting head, indicated generally by the reference character 32, and a work supporting and clamping mechanism, indicated generally by the reference character 34. These several components are mounted on a machine frame, indicated generally by the reference character 36 and the various operating elements thereof are actuated by fluid pressure motors, to be described in detail below, which motors are controlled by appropriate valves forming part of the fluid pressure operating system which is illustrated diagrammatically in FIG. 17 and which is associated with the machine frame and various components in a manner which will presently appear.

Referring first to the work supporting and clamping mechanism, this comprises a bracket member 50 which is secured to an upper surface of the machine frame 36 by screws 52, 52, FIGS. 1 and 15. Slidably supported in a T-slot 54, formed in the upper end of the bracket member is a last or shoe form supporting block 56, provided with an upwardly projecting rib 58 which is adapted to be received within a recess 60 in a shoe form F, FIG. 3. Along one edge of the bracket member 50 adjacent to the T-slot 54, are a series of holes 62, 62 adapted to receive a locking pin 64 the inner end of which also enters a hole in the block 56, for the purpose of holding the block, as well as a shoe form F with the upper U of a shoe S assembled thereon, together with an insole I, and side lasted, in a selected lengthwise position, corresponding to the size of the shoe, as shown by appropriate indicia 66 on the bracket member 50 and a pointer 68 on the block, see FIG. 3, so that the toe end of shoes of different sizes will be positioned in the same predetermined location relative to the frame 36.

Pivotally mounted on the opposite sides of the bracket member 50 are two elongated clamping levers 70, 70 each of which is provided with a work engaging pad portion 72, FIG. 15. One of these clamping levers is connected to the rod 74 of a piston 76 contained within a cylinder 78, see also FIG. 17, while the other of these levers is connected to the cylinder. Thus, when fluid under pressure is admitted to the cylinder 78 through a conduit 80, the clamping levers will be swung about their pivotal mountings in directions to bring their work engaging portions 72, 72 into clamping engagement with the opposite sides of the shoe form F, see dotted line position in FIG. 15. On the other hand, when pressure fluid is exhausted from the cylinder 78, through the conduit 80, a spring 82 will return these levers to the open positions shown in FIG. 15. As will appear below, the admission of pressure fluid to cylinder 78 via conduit 80 from a main pressure supply line 79, and the exhaust of pressure fluid therefrom, is controlled by a pilot operated two-way valve 86, diagrammatically illustrated in FIG. 17.

Adjacent to the bracket member 50 there is also secured to the upper surface of the machine frame 36, a hollow column 90 in which there is received the lower portion of a toe post 92 which carries at its upper end a toe rest 94 of suitable shape and material to conform to the toe portion of a shoe, FIG. 10. As shown, the lower portion of the post 92 is threaded to receive a knurled adjusting nut 96 which is adapted to rest on a supporting surface 98 formed at the upper end of the column 90, FIGS. 2 and 3.

The toe lasting head, indicated generally by the reference character 30, which is similar to that disclosed in United States Letters Patent No. 3,076,209 issued Feb. 5, 1963 in the name of Andrew J. Gilbride, comprises a body portion 100 suitably shaped to receive various operating elements to be referred to below and a cover plate 102 and is secured to one end of a cylinder 104, FIG. 2. This cylinder, in turn, is formed integrally with another cylinder 106 containing a piston 108 having a piston rod 110 which extends outwardly through one end of the cylinder through a suitable gland 112, as shown. This piston rod carries a clevis block 114 by means of which the mentioned cylinders and wiper head are pivotally supported on a slide 116 which is mounted for vertical movement in guideways 118 formed in an upwardly extending bracket 120, secured to the machine frame 36. Threaded through the slide 116 is an adjusting screw 122 provided with a hand wheel 124 and journaled in the bracket 120.

Extending outwardly from the lower side of the body portion 100 of the wiper head 30 are two ears 126, 126 to which are connected the upper ends of two links 128, 128, FIG. 16, and at their lower ends these links are connected to a crossbar 130. This crossbar is mounted in the upper end of the rod 132 of a piston 134, contained within a cylinder 136, see also FIG. 17, which is secured to the machine frame 36 by bolts 138, 138. An adjustable stop screw 140, threaded into the crossbar 130 limits downward movement of the piston 134 and, of course, also of the crossbar 130 and toe wiper head 30. When fluid under pressure is admitted to the cylinder 106 at the right hand side of piston 108, as viewed in FIG. 2 (left hand side FIG. 17), through a conduit 142 and a pilot operated valve 144, the wiper head will be elevated and moved lengthwise of the frame to an operative position adjacent to the toe end of the shoe indicated in FIG. 2 by the broken line outline of one of the wipers 152, see also FIG. 10. On the other hand, when fluid under pressure is admitted to the opposite end of this cylinder through conduit 146 the wiper head will be returned to the retracted position shown in FIGS. 1 and 2. As shown in FIG. 17, flow through conduits 142 and 146 is controlled by suitable flow control valves 143 and 147.

Figure 2:
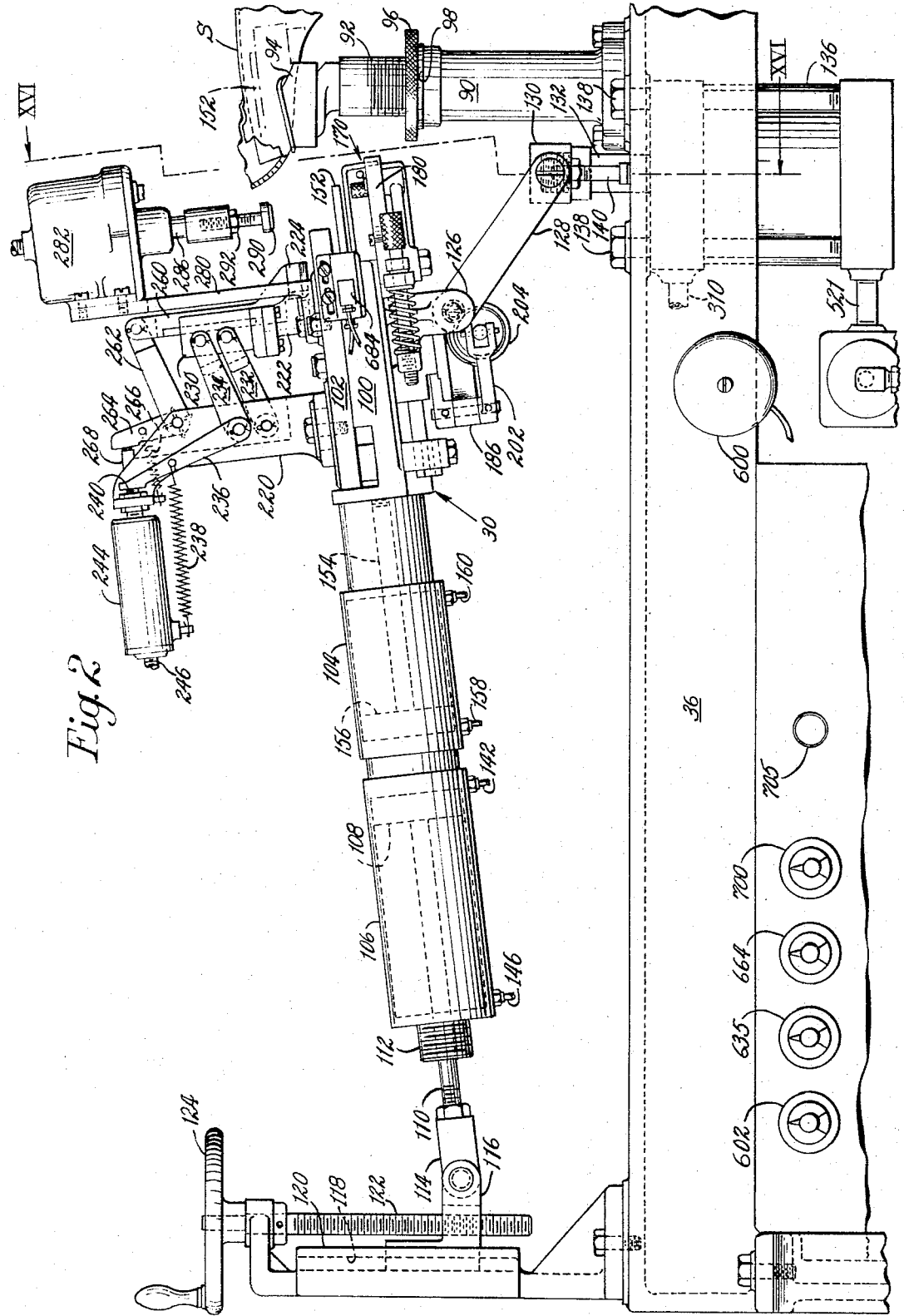
FIG. 2 is a view in side elevation, and on an enlarged scale, showing the toe lasting head of the machine.

Located within the body portion 100 of the wiper head 30, beneath the cover plate 102 are wiper carriers 150, 150 to which are secured a pair of toe wipers 152, 152, FIG. 4. These carriers are connected to the rod 154 of a piston 156, received within the cylinder 104, and are operated by the piston 156 in the usual manner to advance and close the wipers when fluid under pressure is admitted to the cylinder 104, on the left hand side of the piston 156, FIG. 2, by means of a conduit 158, see also FIG. 17. As shown in FIG. 2, the wiper carriers are retracted and the wipers withdrawn and opened as the result of the admission of fluid under pressure to the cylinder 104, on the right hand side of the piston 156 through a conduit 160, and a pilot operated valve 162, FIG. 17, conduit 158 now being connected to exhaust.

Disposed beneath the wipers 152, 152 is a toe band indicated generally by reference character 170 and comprising a U-shaped piece 172 of a suitable material such, for example, as Teflon (tetrafluoroethylene) secured to a thin strip of spring steel 174, FIGS. 7, 10–13. This toe band is supported and operated by mechanism which is essentially the same as that disclosed in U.S. Letters Patent No. 2,986,753 granted June 6, 1961 in the name of Andrew J. Gilbride to which reference may be made for specific details of construction not herein described. Accordingly, the toe band is supported at its outer ends by means of a pair of links 180, 180, FIGS. 7 and 17, which are connected to an equalizing lever 182 carried by an operating lever 184 which is pivotally mounted on the wiper head 100. The toe band is also supported at its toe end on a block 186 which is guided for sliding movement on the wiper head to the right as viewed in FIG. 10, and toward the toe end of the shoe being lasted, to the extent determined by a suitable stop such, for example, as an abutment bar 188, FIGS. 10–13.

Figure 7:
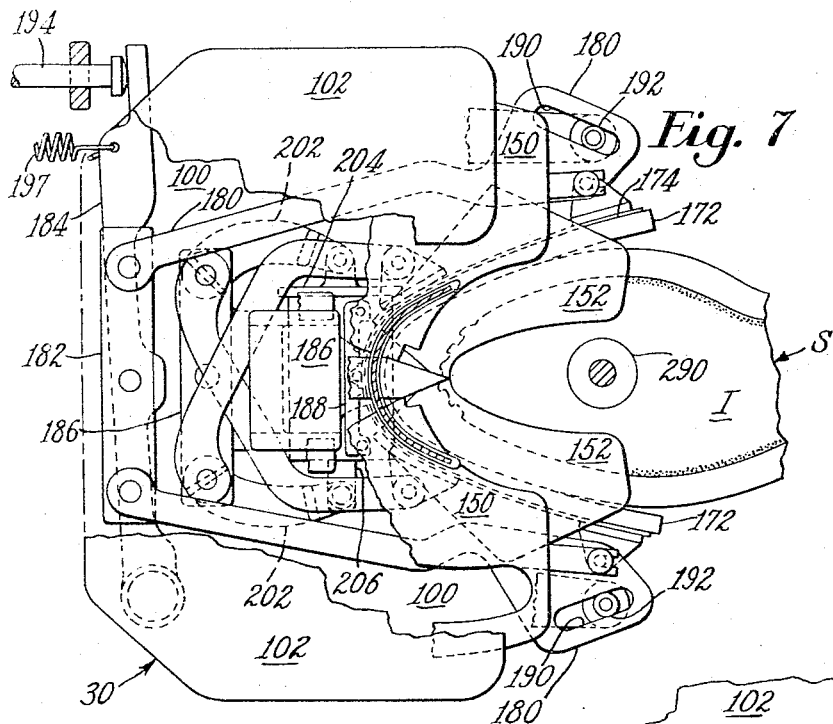
FIG. 7 is a plan view of a portion of the toe lasting head showing the toe wipers in operating position and with some parts broken away to facilitate the disclosure.

As shown in FIG. 7, at their outer ends, the two links 180, 180 are provided with angularly disposed slots 190, 190 which are adapted to cooperate with pins 192, 192 to cause the band to close around the toe end of a shoe as the band is moved to the right, FIG. 10, in response to a clockwise swinging movement of the operating lever 184, imparted thereto by means of the rod 194 of a piston 196, FIG. 17, contained within a cylinder 198, against the resistance of a return spring 197, when fluid under pressure is admitted to this cylinder through a conduit 200. Pivotally mounted on a rearwardly extending portion of the block 186, FIG. 7, are a pair of bell crank levers 202, 202 having pressure pads for engaging the opposite sides of the toe band, adjacent to its toe end and adapted to be actuated by an oppositely moving cylinder 204 and piston 206 when fluid under pressure is admitted to the cylinder through conduits 208, 209 and a pilot operated valve 210.

Figure 8:
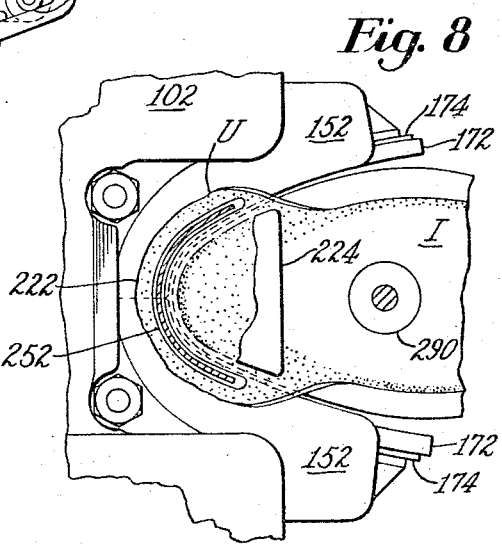
FIG. 8 is another plan view of a portion of the toe lasting head showing the distributor and insole holddown, associated with the toe lasting head, in their operating positions.

Mounted on and extending upwardly from the wiper head is a bracket 220 which supports a distributor 222 and an insole holddown 224, FIGS. 2, 4 and 16. The distributor 222, which is generally U-shaped in configuration, FIG. 8, is secured to the lower end of a supporting member 230 which is mounted on the bracket 220 for vertical movement by means of a link 232 and one arm 234 of a bell crank lever having another arm 236, FIG. 2. A coil spring 238 tends to hold the supporting member 230, and with it the distributor 222, in the elevated positions shown and with the lever arm 236 in engagement with the rod 240 of a piston 242 (FIG. 17) contained within a cylinder 244 mounted on the upper end of the bracket 220. When fluid under pressure is admitted to the cylinder 244 behind the piston 242, through conduit 246 and a pilot operated valve 248 (FIG. 17) this piston will be moved to the right as viewed in FIG. 2 against the resistance of a return spring 250 (FIG. 17) thereby lowering the distributor to its operative position as shown in FIGS. 8, 11 and 12, in which a resilient work engaging portion 252 of the distributor 222 yieldingly presses the lasting margin of the upper of a shoe being lasted against the top flat surfaces of the wipers 152, 152.

The insole holddown 224 is formed on the lower portion of a link 260 which is guided for sliding movement in the supporting member 230 and connected at its upper end to one arm 262 of a bell crank lever having a second arm 264 and which is pivotally mounted on the bracket 220. A coil spring 266 yieldingly holds the link 260 and insole holddown 224 in the elevated positions in which they are shown in FIG. 2 and with the arm 264 of the bell crank lever held against the piston rod 268 of a piston 270 (FIG. 17) contained within a cylinder 272, also mounted on the bracket 220. When fluid under pressure is admitted to the cylinder 272 behind the piston 270, through a conduit 274 and a pilot operated valve 276, this piston will be moved to the right, as viewed in FIG. 2, against the resistance of a return spring 278 thereby lowering the insole holddown 224 into its operative positions as shown in FIGS. 8, 11 and 12, in which it is in engagement with the toe end of the insole I of the shoe S being lasted.

Also mounted on the toe wiper head 30 is a second bracket 280, FIGS. 2, 4 and 16, to the upper portion of which there is secured a cylinder 282, see also FIG. 17, containing a piston 284 having a piston rod 286. At its lower end, this piston rod is enlarged and is threaded to receive the stem of a pressure abutment 290, a lock nut 292 being provided for holding the pressure abutment in adjusted position. A return spring 294 (FIG. 17) normally holds the piston 284 together with the pressure abutment 290 in the elevated positions shown in FIGS. 2 and 10, when the space in the cylinder 282, behind the piston 284, is connected to exhaust through a conduit 296, flow control valve 298 and a pilot operated valve 300, FIG. 17. On the other hand, when the valve 300 is shifted to a position to connect the conduit 296 to a source of fluid under pressure, the piston 284 will be moved downwardly (FIG. 2) until the pressure abutment 290 engages the bottom of the shoe S being lasted, see FIG. 11, whereupon as a result of the continued downward movement of the piston 284, the wiper head 30 will be lifted until this piston reaches the end of its stroke in cylinder 282. As will presently appear, the fluid pressure system is so arranged that the opposite ends of the cylinder 136 are, at this time, connected to exhaust thereby permitting the piston 134 to move freely within the cylinder 136.

It is during this upward movement of the wiper head that the upper materials are tensioned around and shaped to the toe end of the last by the actions of the distributor 222 and toe band 170, as will be explained in detail hereinafter. The pressure abutment 290 is so adjusted on the piston rod 286 that this upward movement will be terminated with the wipers 152, 152 disposed in the proper plane for subsequent advancing and closing movements to wipe the lasting margin of the upper materials inwardly over the toe end of the shoe. As will also presently appear, at the conclusion of this overwiping action, the space behind the piston 284 will be connected to exhaust while fluid under pressure is admitted to the space in the cylinder 136 above the piston 134 (as viewed in FIGS. 2 and 17) through a conduit 310, a pressure regulator valve 312, a check valve 314, a conduit 316 and two pilot operated valves 318 and 320, thereby causing the wipers to apply a regulated bedding down pressure to the overwiped lasting margin of the upper materials.

Figure 14:
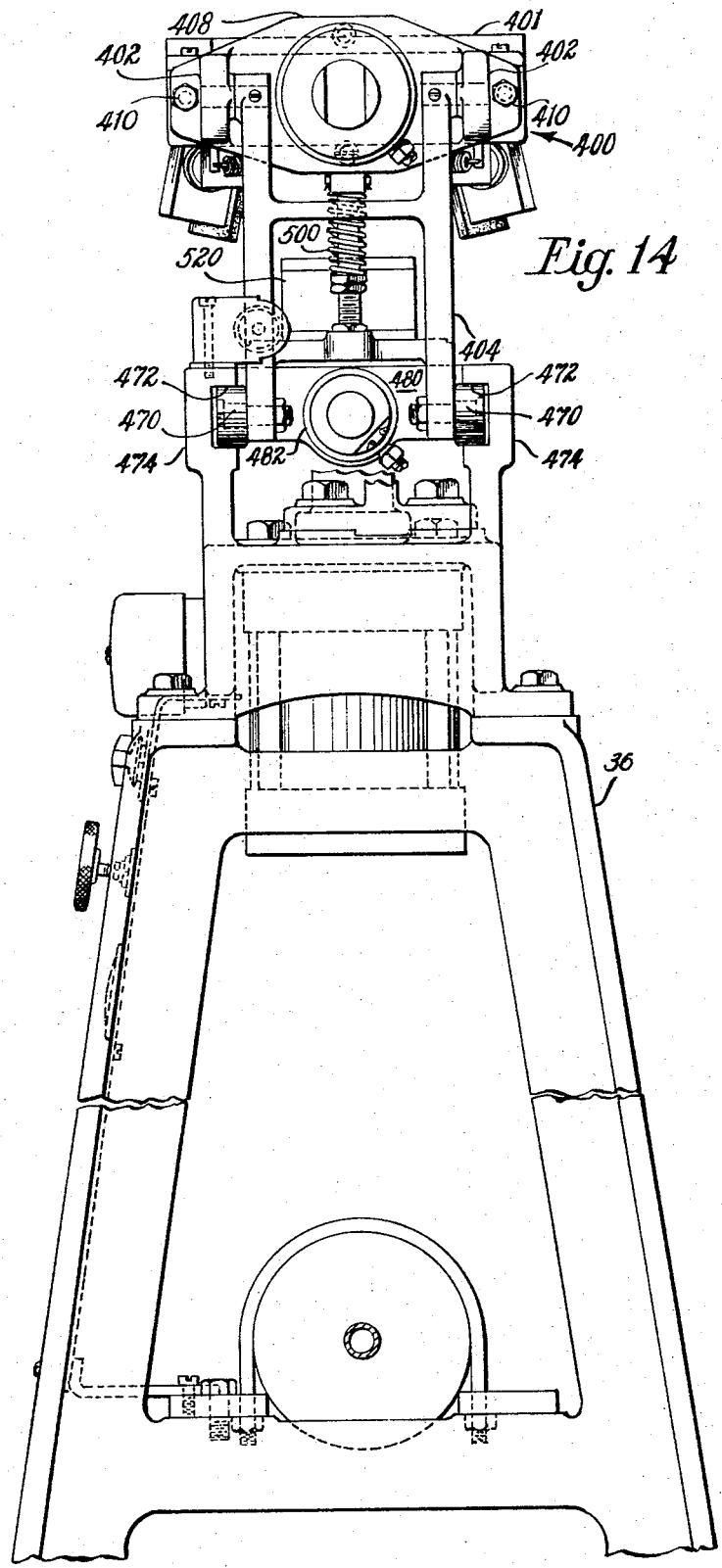
FIG. 14 is a view in end elevation of the machine, as viewed from the right in FIG. 1.

The heel lasting head, indicated generally by the reference character 32, FIGS. 1 and 3, comprises a body portion 400 which is pivotally mounted by means of a pair of ears 402, 402 on two spaced-apart upwardly projecting arm portions 404, 404 formed integrally with a carriage 406, see also FIGS. 4 and 14, the ears 402, 402 extending outwardly from an end plate 408 which is secured to the body portion 400 by bolts 410, 410. Contained within the body portion 400, beneath a cover plate 401, are a pair of wiper carriers 420, one of which appears in FIGS. 5 and 6, and see also FIG. 9, on which there are mounted a pair of heel end wipers 422, 422 and a pair of heel side wipers 424, 424, FIGS. 4 and 9. These wiper carriers, wipers and the associated wiper operating mechanism, not shown in detail, are constructed substantially as disclosed in U.S. Letters Patent No. 3,138,810 granted June 30, 1964 in the name of Karl V. Becker, see especially FIGS. 4 and 5 of the drawings of this patent, to which reference may be made for details not herein described. The wipers 422 and 424 which correspond to the wipers 216 and 220 of the patented construction are adapted to be advanced and closed by means of a piston 430, contained within a cylinder 432 having a piston rod 434 connected to the wiper operating mechanism when fluid under pressure is admitted to the cylinder 432 on the right hand side of the piston 430, as viewed in FIG. 4, through a conduit 436 and the pilot operated valve 162, FIG. 17, previously referred to. As shown in FIGS. 3 and 4, the cylinder 432 is supported on the end plate 408 by means of screw studs 438, 438. The wipers 422 and 424 are withdrawn and opened in response to the admission of fluid under pressure to the cylinder 432 on the left hand side of the piston 430 (FIG. 4) through a conduit 440 and the aforementioned valve 162.

Also associated with the heel lasting head is a heel band 450, corresponding generally in construction and mode of operation with the heel bands disclosed and described in detail in the above-mentioned Becker patent, see FIGS. 12 and 13 of the drawings thereof. Thus, the band 450 comprises a U-shaped resilient band member 452 molded of suitable material such, for example, as rubber, to provide an inner operating surface having a contour corresponding in shape generally to the shape of the heel portion of a shoe. This resilient band is supported on a thin band of resilient steel 454 and is mounted at its outer ends on the outer ends of two arms 456, 456, FIGS. 4 and 9, which are pivotally mounted at their inner ends on the body portion 400 of the heel lasting head, the arms 456, 456 corresponding generally to the arms 182, 182 shown in FIG. 12 of the drawings of the Becker patent. Surrounding the steel band 454 is a relatively wide chain 460 which is also connected to the outer ends of the arms 456, 456. At its inner end, the heel band 450 is supported in a heightwise direction by means of a sheet metal bracket 462, FIGS. 3, 5 and 6. Connected to each of the arms 456 is a coil spring 464, see FIG. 3, and these springs tend to hold the heel band in an opened position when the heel lasting head is in the idle and retracted position in which it is shown in FIG. 3. However, as will be readily understood, when the heel lasting head is moved to operative position, as shown in FIGS. 4, 5 and 6, the resilient band 452 will be wrapped snugly around the heel end of the shoe, thus to press and mold the heel portion of the upper U to the shape of the heel end of the form F (or last) on which the upper U is mounted.

The carriage 406, and hence the wiper head 32 which is carried thereby, are mounted for rectilinear movement on the frame 36 by means of four rollers 470, 470 adapted to ride in tracks 472, 472 formed in two upwardly extending portions 474, 474 of the machine frame 36, only two of the respective pairs being seen in FIG. 14. For effecting such rectilinear movements of the carriage and wiper head, there is mounted on a cross web 480 of the carriage a cylinder 482 in which there is contained a piston 484, FIG. 17, the rod 486 of which is secured at its outer end to a cross member 488 of the frame 36, FIG. 3. The flow of pressure fluid into and exhaust from the opposite ends of the cylinder 482, through conduits 490, 492 is controlled by two flow control valves 494, 496 and the previously mentioned pilot operated valve 144, FIG. 17. In this connection, it should be noted that in the case of the heel lasting head the rectilinear movement is effected by the cylinder 482 which actually moves as the piston 484, which is fixed to the frame 36, remains stationary.

The body portion 400 of the heel lasting head 32 is yieldingly supported in the generally horizontal position in which it is shown in FIG. 3 by means of a compression spring 500 which is interposed between an adjusting nut 502, threaded on a post 504 and a plunger 506 which is slidable on the upper end of the post on which the body portion rests. Upward movement of this plunger under the action of the spring 500 is limited by the engagement of a cross pin 508, mounted in the post with the lower end of a slot 510 formed in the plunger. The post 504 is threaded into a boss on the carriage 406 and is held in place by means of a locknut 512.

Connected to a stud 514, threaded into the body portion 400, is the upper end of the rod 516 of a piston 518, FIGS. 3 and 17, contained within a cylinder 520 which is mounted on the carriage 406. When pressure fluid is admitted to the space above the piston 518 through a conduit 519 and the space beneath this piston connected to exhaust, through a conduit 521 and valves 318 and 320, the wiper head 400 will be swung in a counterclockwise direction to cause the wipers 422, 424 to exert bedding down pressure on the wiped in lasting margin of the upper at the heel end of the shoe.

The manner in which the several components of the machine operate will be clear from the foregoing description and the operation of the machine as a whole to last the toe and heel ends of a shoe will now be explained. In its idle state, the several operating elements of the machine assume the positions in which they are shown in FIGS. 1, 2 and 3 of the drawings, while the various control valves previously mentioned, and others to be referred to below, are in the positions shown in FIG. 17. Before initiating an automatic operating cycle of the machine, the operator will place the side lasted shoe S and its form F on the block 56 of the shoe supporting means with its forepart resting on the toe rest 94, as shown in FIG. 3. The toe rest will have been previously adjusted to the proper heightwise position for the style of the shoe and the block 56 will have been adjusted to the proper lengthwise position to accommodate the size of the shoe S so that the toe end of the shoe is in the desired predetermined location relative to the frame. Now, the operator manually shifts a so-called starting valve 600, which is connected to an auxiliary pressure supply line 79a, through an emergency shut-off valve 602, to its other position, thus admitting pressure fluid to the left-hand pilot of a valve 604 which moves to the right to its other position, admitting pressure fluid to a pilot line 606 having two branches, as shown in FIG. 17, and connecting another pilot line 608 to exhaust, together with an auxiliary pressure line 610 from which pilot lines 612, 614 and 616 extend, respectively, to pilot-operated valves 300, 318 and 162, referred to above. Valve 86 will now be shifted to the right against the resistance of a return spring 87, thus to admit pressure fluid through the conduit 80 to the cylinder 78, causing the shoe form F to be firmly gripped by the clamping levers 70, 70 (see the dotted line positions of these levers in FIG. 15), and valve 144 will be shifted to the right, causing pressurized fluid to be admitted to conduits 142 and 492, and thence to cylinders 106 and 482, through flow control valves 143 and 496, respectively, while the opposite ends of these cylinders are connected to exhaust. As a result of the admission of pressurized fluid to these cylinders, the toe lasting head will be elevated and moved lengthwise from its retracted position to the operative position shown in FIG. 10, and indicated in dotted lines in FIG. 2, by movement of cylinder 106 to the right, FIG. 2, and to the left, FIG. 17, and the heel wiper head 32 will be moved to the left from the retracted position in which it is shown in FIG. 3 to the operative position in which it appears in FIGS. 4, 5 and 6, by movement of the cylinder 482 to the left, FIGS. 3 and 17. The heel band 452 will now embrace the heel end of the shoe as shown in FIG. 4. Both ends of cylinders 136 and 520 will now be connected to exhaust through line 610 and valves 318 and 320. With reference to cylinders 106 and 482, just mentioned, and other cylinders and pistons to be referred to below, it is to be understood that they are digrammatically illustrated in FIG. 17 and arranged for sake of convenience with no particular regard to their exact positions or orientation in the machine itself. Thus, movements of these elements will be referred to in the other figures of the drawings to avoid confusion.

As the left-hand end of the cylinder 106 is connected to exhaust through the conduit 146 and flow control valve 147, pressurized fluid acting on a diaphragm 618, associated with a valve 620, and diagrammatically illustrated in FIG. 17, is also connected to exhaust through a line 621, so that this valve is shifted to the left by its spring 622, thus admitting pressurized fluid to pilot lines 630, 632, associated with pilot valves 248 and 276 mentioned above, from the main pressure line 79, a branch line 634, and open manually operable valve 635 and a normally open cam operated valve 636. The pilot valves 248 and 276 are now shifted to the right so that pressurized fluid is admitted to conduits 246 and 274 and thence to cylinders 244 and 272 from extensions of the main pressure line 79. The distributor 222 and insole holddown 224 will now be moved downwardly to the positions shown in FIG. 11, with the insole holddown 224 bearing against the toe end of the insole I of the shoe S, and the resilient work engaging portion 252 of the distributor clamping the lasting margin of the upper U on the upper surfaces of the toe wipers 152. The force exerted by the distributor on the upper may be varied by means of a pressure regulator valve 640, interposed in the line 79 immediately ahead of the valve 248.

Leading from the conduit 274 is a pilot line 650 having one branch going to the valve 210 and another branch going to the valve 300. Valve 210 is thus shifted to the right, admitting pressurized fluid from another branch of the main supply line 79, through a pressure regulator valve 652 to the conduits 200 and 208. The toe band 170 will now be moved to the right and wrapped around the toe end of the shoe, as shown in FIG. 11. At the same time, the valve 300 will be shifted to the left, thus admitting pressurized fluid through conduit 296 and a flow control valve 298 to the cylinder 282. Thus, after the toe band has assumed its operating position, see FIG. 11, the piston 284 will move the pressure abutment 290 downwardly into engagement with the bottom of the shoe and, as such downward movement of this abutment is continued, the wiper head 30, together with the toe band 170 and the toe wipers 152, will be elevated to the predetermined heightwise position shown in FIG. 12, when the piston 284 reaches the end of its downward stroke. During such upward movement of the wiper head, the upper materials at the toe end of the shoe are shaped to the toe end of the last by the action of the toe band 170 and at the same time are tensioned heightwise about the last by the action of the distributor 222 in holding the lasting margin frictionally on the wipers, the lasting margin actually being pulled out from between the resilient work engaging portion 252 of the distributor and the upper surfaces of the wipers 152.

Figure 9:
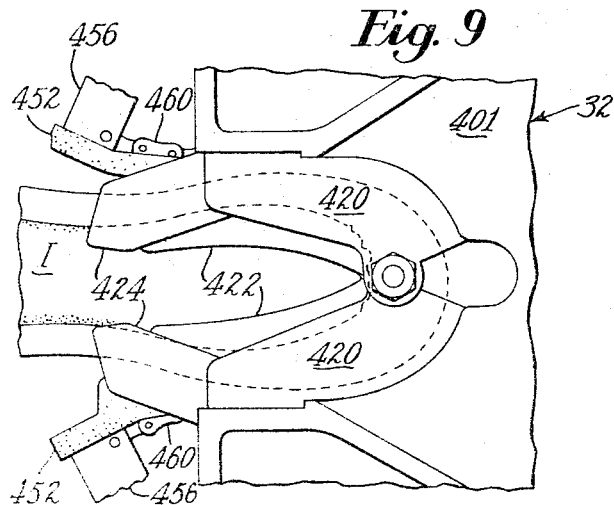
FIG. 9 is a plan view of a portion of the heel lasting head showing the heel seat wipers in operating position.

As is diagrammatically illustrated in FIG. 17, when the piston 284 reaches the limit of its downward (as viewed in FIGS. 1 and 2) movement, a cam 660 on the piston rod 286 shifts a valve 662 to the left, thus admitting pressure fluid from the main line 79, through a normally open manually operable valve 664, to the left-hand pilot of the valve 162, causing this valve to move to the right, pilot line 616 leading to the other side of this valve being at this time connected to exhaust through valve 604. Pressure fluid from the main line 79 now flows through the conduits 158 and 436 to the wiper operating cylinders 104 and 432, so that the toe wipers 152 are advanced and closed, by movement of piston 156 to the right, FIG. 2, to wipe the lasting margin of the upper U inwardly over the insole at the toe end of the shoe, as shown in FIG. 13, and see also FIG. 7, while the heel wipers 422, 424 are similarly advanced and closed, by movement of piston 430 to the left, FIG. 4, to wipe the lasting margin of the upper inwardly over the insole at the heel end of the shoe, as shown in FIGS. 6 and 9.

The valve 636, referred to above, and which is normally held in the open position shown in FIG. 17 by a spring 670, is mounted adjacent to one of the toe wiper slides 150, one side of which is shaped to provide a cam surface 672, FIG. 4. This cam surface engages a roll 674, associated with the valve plunger, and immediately as the toe wipers commence their advancing and closing movements, valve 636 is shifted to the left to connect the lines 630, 632 to exhaust. This, in turn, causes pilot operated valves 248 and 276 to be returned to the positions shown in FIG. 17, and the distributor 222 and insole holddown 224 to be elevated by springs 250 and 278 to the positions shown in FIG. 13 and out of the way of the advancing and closing wipers 152. Also, the line 650 will be connected to exhaust through the valve 276, causing valve 210 to be returned by its spring to a position to connect lines 200 and 208 to exhaust, thus causing the toe band 170 to be retracted by spring 197, FIG. 7. Line 612 now being connected to exhaust through the valve 604, valve 300 will remain in the position to which it was shifted when pressure fluid was previously admitted to the line 650.

The other wiper slide 150, FIG. 4, is provided with a cam surface 680 which is adapted to engage a roll 682, associated with a valve 684, when the wipers 152 have completed, or at least nearly completed their advancing and closing movements, to shift this valve to the left, FIG. 17, thus to admit presure fluid from the auxiliary pressure line 79a to a pilot line 690 and to a pressure line 692. The pilot line 690 leads to the right-hand end of a valve 320, normally held in the exhausting position in which it is shown in FIG. 17 by a spring 694, and this valve is now shifted to the left to admit pressure fluid from the line 79 to the reversing valve 318 and thence to cylinders 136 and 520, above the pistons 134 and 518, as viewed in FIGS. 2 and 3, while the other ends of these cylinders are connected to exhaust. The toe wiper head 30 and heel wiper head 32 will now be forced downwardly to cause the toe wipers 152 and heel wipers 422, 424 to apply a bedding down pressure to the overlasted margin of the upper. In the case of the toe wipers, this bedding down pressure may be varied by means of a pressure regulator valve 312.

The line 692, which is pressurized at the same time as the pilot line 690, leads to a manually operable, normally open valve 700, a conventional pneumatic time delay device 702, indicated diagrammatically in FIG. 17, and through a double check valve 704, to the right-hand end of the valve 604 and to a so-called stop valve 705. Accordingly, after a predetermined time interval, during which the bedding down pressure is applied by the toe wipers and by the heel wipers, valve 604 will be returned to its original position, thus pressurizing the lines 608 and 610 and connecting line 606 to exhaust. Valve 318 is now returned to its original position to reverse the pressure and exhaust connections to cylinders 136 and 520, so that the wiper heads 30 and 32 are immediately elevated by their pistons 134 and 518. Valve 300 is also returned to its original position, by pressure fluid in the line 612, thus connecting the cylinder 282 to exhaust so that spring 294 moves the piston 284 upwardly and elevates the pressure abutment 290 to the position shown in FIG. 13.

Pressure fluid in the line 608 shifts valve 144 back to the left, thus connecting conduits 146 and 490 to exhaust so that the toe wiper head 30 and heel wiper head 32 are retracted away from the now completely lasted shoe. Valve 162 is also shifted to the left by pressure fluid in line 616, thus connecting conduits 160 and 440 to the main pressure line 79 with the result that the toe wipers 152 and heel wipers 422, 424 are retracted and opened. As the toe wipers return to their open positions, the cam 672 resets valve 636, while cam 680 permits the valve 684 to be shifted to the right by a spring 710, thus connecting the line 690 to exhaust. Spring 694 now shifts valve 320 to connect line 521 to exhaust, through valve 318. The spaces in cylinder 136 beneath the piston 134 and in cylinder 520 beneath the piston 518 will now be connected to exhaust, as is also the space above the piston 518, while pressure fluid is admitted to the space above the piston 134, through the line 610. The various operating elements are now back in their original positions. Also, when the line 606 was connected to exhaust, through valve 604, the spring 87 returned the valve 86 to its original position to connect the cylinder 78 to exhaust, with the result that the clamping levers 70, 70 are returned to open positions by the spring 82, thereby releasing the shoe for removal by the operator.

From the foregoing detailed description of a fully automatic operating cycle, it will be seen that all the operator has to do is to set the toe rest 94 to the correct height for the style of shoe and the block 56 of the shoe supporting means in the right position for the size of the shoe, place a shoe form with side lasted upper and precemented insole on the shoe supporting block, which is facilitated by having the toe and heel lasting units in their retracted positions, and actuate the starting valve 600. During the operating cycle which follows, after the toe and heel lasting units have been moved to their operative positions adjacent to the end portions of the shoe, the upper materials at the toe end of the shoe are first tensioned around and shaped to the toe end of the last by the toe band, in response to heightwise movement relative to the shoe, then the lasting margin is wiped inwardly over and pressed against the toe end of the insole by the toe wipers, while at the same time the upper materials at the heel end of the shoe are being shaped to the last by the heel band and the lasting margin wiped inwardly over against the heel end of the insole by the heel seat wipers. After a predetermined interval during which the so-called bedding-down pressure is applied to the lasting margin at both ends of the shoe, to secure it adhesively to the insole, the wipers are elevated away from the now completely lasted shoe, the various operating elements are returned to their original positions, and the shoe released for removal from the machine.

As shown in FIG. 1 of the drawings, the machine therein illustrated is provided with a reservoir 750 adapted to be connected to a suitable outside source of pressure fluid, e.g. compressed air, by means of a conduit 752. The main pressure line 79 and the auxiliary pressure line 79a, diagrammatically illustrated in FIG. 17, are connected to this pressure reservoir. For convenience of operation, the several manually operable valves 602, 635, 664 and 700 are mounted on a front panel 754 while the starting valve 600 is mounted on the frame 36 adjacent to this panel. Also, the control knobs for the pressure regulator valves 312, 640 and 652, together with their associated pressure gauges, are mounted on the panel 754. In the normal use of the machine, valves 602, 635, 664 and 700 are left open. However, when desired they may be used by the operator to cause the machine to go through only a portion of its complete automatic operating cycle. Thus, if valve 635 is closed the machine will come to a stop after the toe wiper head and heel wiper head have been moved from their retracted positions in toward a shoe in the machine, while if all of these valves are open except the valve 700, the machine will go through a complete operating cycle up to the wiper bedding down action, which will be continued indefinitely and until the valve 700 is opened. Also mounted on the panel 754 is the stop valve 705 which may be used in an emergency or otherwise, to terminate the operating cycle. Valve 602 is primarily for safety purposes and when moved to closed position will prevent the accidental initiation of an operating cycle.

Having thus described our invention, what we claim as new and desired to secure by Letters Patent of the United States is:

1. A machine for lasting the opposite end portions of a shoe having a main frame, a support for a shoe on said frame adapted to position the toe end of the shoe in a predetermined location relative to the frame, a toe lasting unit mounted on the frame for movement between a retracted position remote from the toe end of a shoe on the support to a predetermined operative position adjacent to the toe end of the shoe, a heel lasting unit mounted on the frame for movement between a retracted position remote from the heel end of a shoe on the support to an operative position adjacent to the heel end of a shoe, power operated means for effecting such movements of said toe lasting unit and said heel lasting unit and for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to its operative position and then to cause the toe and heel units to operate.

2. A machine for lasting the opposite end portions of a shoe having a main frame, a support for a shoe on said frame manually adjustable to position the toe ends of shoes of different sizes in the same predetermined location relative to the frame, a toe lasting unit mounted on the frame for movement between a retracted position remote from the toe end of a shoe on the support to a predetermined operative position adjacent to the toe end of the shoe, a heel lasting unit mounted on the frame for movement between a retracted position remote from the heel end of a shoe on the support to an operative position adjacent to the heel end of the shoe, power operated means for effecting such movements of said toe lasting unit and said heel lasting unit and for operating the toe and heel lasting units, and means for controlling the operation of said power operated means including a manually operated control member and associated control elements adapted, in response to actuation of the manually operable control member by an operator, first to cause the toe lasting unit to move from its retracted position to its operative position and the heel lasting unit to move from its retracted position to its operative position and then to cause the toe and heel units to operate.

3. A machine for lasting the opposite end portions of a shoe having a main frame, a support for a shoe on the frame adapted to position the toe end of the shoe in a predetermined location relative to the frame, a toe lasting unit mounted on the frame for movement between a retracted position remote from the toe end of a shoe on the support to a predetermined operative position adjacent to the toe end of the shoe, a heel lasting unit including a heel embracing band mounted on the frame for movement between a retracted position remote from the heel end of a shoe on the support to an operative position with the heel band embracing the heel end of the shoe, power operated means for effecting such movements of said toe lasting unit and said heel lasting unit and for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to its operative position with the heel band embracing the heel end of the shoe and then to cause the toe and heel units to operate.

4. A machine for lasting the opposite end portions of a shoe having a main frame, a support for a shoe on said frame, manually adjustable to position the toe ends of shoes of different sizes in the same predetermined location relative to the frame, a toe lasting unit mounted on the frame for movement between a retracted position remote from the toe end of a shoe on the support to a predetermined operative position adjacent to the toe end of the shoe, a heel lasting unit including a heel embracing band mounted on the frame for movement between a retracted position remote from the heel end of a shoe on the support to an operative position with the heel band embracing the heel end of the shoe, power operated means for effecting such movements of said toe lasting unit and said heel lasting unit and for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to operative position with its heel band embracing the heel end of the shoe and then to cause the toe and heel units to operate.

5. A machine for lasting the opposite end portions of a shoe having a main frame, a support for a shoe on said frame adapted to position the toe end of the shoe in a predetermined location relative to the frame, a toe lasting unit mounted on the frame for movement between a retracted position remote from the toe end of a shoe on the support to a predetermined operative position adjacent to the toe end of the shoe, a heel lasting unit mounted on the frame for movement between a retracted position remote from the heel end of a shoe on the support to an operative position adjacent to the heel end of the shoe, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to its operative position, then to cause the toe and heel lasting units to operate on the toe and heel ends of the shoe and lastly to cause the toe and heel lasting units to return to their retracted positions.

6. A machine for lasting the opposite end portions of a shoe having a main frame, a support for a shoe on said frame manually adjustable to position the toe ends of shoes of different sizes in the same predetermined location relative to the frame, a toe lasting unit mounted on the frame for movement between a retracted position remote from the toe end of the shoe on the support to a predetermined operative position adjacent to the toe end of the shoe, a heel lasting unit mounted on the frame for movement between a retracted position remote from the heel end of a shoe on the support to an operative position adjacent to the heel end of the shoe, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to its operative position, then to cause the toe and heel lasting units to operate on the toe and heel ends of a shoe, and lastly to cause the toe and heel lasting units to return to their retracted positions.

7. A machine for lasting the opposite end portions of a shoe having a main frame, a support for a shoe on said frame adapted to position the toe end of the shoe in a predetermined location relative to the frame, a toe lasting unit including a toe band for shaping the upper materials at the toe end of a shoe and wipers for thereafter wiping the lasting margin of the upper inwardly over and for pressing it against the toe end of the insole of the shoe mounted on the frame for movement between a retracted position remote from the toe end of a shoe on the support to a predetermined operative position adjacent to the toe end of a shoe, a heel lasting unit including heel seat wipers and a heel embracing band mounted on the frame for movement between a retracted position remote from the heel end of a shoe on the support to an operative position with the heel band embracing the heel end of the shoe, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause the toe lasting unit to move from its retracted position to its operative position and the heel lasting unit to move from its retracted position to its operative position with its heel band embracing the heel end of the shoe, then to cause the toe and heel lasting units to operate on the toe and heel ends of the shoe, and lastly to cause the toe and heel lasting units to return to their retracted positions.

8. A machine for lasting the opposite end portions of a shoe having a main frame, a support for a shoe on said frame manually adjustable to position the toe end of the shoe in a predetermined location relative to the frame, a toe lasting unit including a toe band for shaping the upper materials at the toe end of the shoe and wipers for thereafter wiping the lasting margin of the upper materials inwardly over and for pressing it against the toe end of the insole of the shoe mounted on the frame for movement between a retracted position remote from the toe end of a shoe on the support to a predetermined operative position adjacent to the toe end of the shoe, a heel lasting unit including heel seat wipers and a heel embracing band mounted on the frame for movement between a retracted position remote from the heel end of a shoe on the support to an operative position with the heel band embracing the heel end of the shoe, power operated means for effecting such movements of said toe lasting unit and said heel lasting unit, power means for operating the toe and heel lasting units, and means for controlling the operation of said power operated means including a manually operable control member and associated control elements adapted in response to actuation of the manually operable control member by an operator first to cause the toe lasting unit to move from its retracted position to its operative position and the heel lasting unit to move from its retracted position to its operative position with the heel band embracing the heel end of the shoe, then to cause the toe and heel lasting units to operate on the toe and heel ends of the shoe, and lastly to cause the toe and heel lasting units to return to their retracted positions.

9. A machine for lasting the opposite end portions of a shoe having a main frame, a support for a shoe comprising an upper and an insole assembled on a shoe form on said frame adapted to position the toe end of the shoe in a predetermined location relative to the frame, means for clamping the form to the support, a toe lasting unit mounted on the frame for movement between a retracted position remote from the toe end of a shoe on the support to a predetermined operating position adjacent to the toe end of the shoe, a heel lasting unit mounted on the frame for movement between a retracted position remote from the heel end of a shoe on the support to an operative position adjacent to the heel end of the shoe, power means for operating said clamping means, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause the clamping means to operate, next to cause the toe and heel lasting units to move to their operative positions, then to cause the toe and heel lasting units to operate on the toe and heel ends of the shoe and lastly to cause the toe and heel lasting units to return to their retracted positions and the clamping means to release the shoe form.

10. A machine for lasting the opposite end portions of a shoe having a main frame, a support for a shoe comprising an upper and an insole assembled on a shoe form on said frame manually adjustable to position the toe ends of shoes of different sizes in the same predetermined location relative to the frame, means for clamping the form to the support, a toe lasting unit mounted on the frame for movement between a retracted position remote from the toe end of a shoe on the support to a predetermined operative position adjacent to the toe end of the shoe, a heel lasting unit mounted on the frame for movement between a retracted position remote from the heel end of a shoe on the support to an operative position adjacent to the heel end of the shoe, power means for operating said clamping means, power operated means for effecting such movements of said toe lasting unit and said heel lasting unit, power means for operating the toe and heel lasting units, and means for controlling the operation of said power operated means including a manually operable control member and associated control elements adapted in response to actuation of the manually operable control member by an operator first to cause said clamping means to operate, next to cause the toe lasting unit to move from its retracted position to its operative position and the heel lasting unit to move from its retracted position to its operative position, then to cause the toe and heel lasting units to operate on the toe and heel ends of the shoe, and lastly to cause the toe and heel lasting units to return to their retracted positions and the clamping means to release the shoe form.

11. A machine for lasting the opposite end portions of a shoe having a main frame, a support for a shoe comprising an upper and an insole assembled on a shoe form on said frame adapted to position the toe end of the shoe in a predetermined location relative to the frame, means for clamping the form to the support, a toe lasting unit including a toe band for shaping the upper materials at the toe end of a shoe and wipers for thereafter wiping the lasting margin of the upper materials inwardly over and for pressing it against the toe end of the insole of the shoe mounted on the frame for movement between a retracted position remote from the toe end of a shoe on the support to a predetermined operative position adjacent to the toe end of the shoe, a heel lasting unit including heel seat wipers and a heel embracing band mounted on the frame for movement between a retracted position remote from the heel end of a shoe on the support to an operative position with the heel band embracing the heel end of the shoe, power means for operating said clamping means, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause the clamping means to operate, next to cause the toe lasting unit to move from its retracted position to its operative position and the heel lasting unit to move from its retracted position to its operative position with its heel band embracing the heel end of the shoe, then to cause the toe and heel lasting units to operate on the toe and heel ends of the shoe, and lastly to cause the toe and heel lasting units to return to their retracted positions and the clamping means to release the shoe form.

12. A machine for lasting the opposite end portions of a shoe having a main frame, a support for a shoe comprising an upper and an insole assembled on a shoe form on said frame manually adjustable to position the toe end of the shoe in a predetermined location relative to the frame, means for clamping the form to the support, a toe lasting unit including a toe band for shaping the upper material at the toe end of a shoe and wipers for thereafter wiping the lasting margin of the upper materials inwardly over and for pressing it against the toe end of the insole of the shoe mounted on the frame for movement between a retracted position remote from the toe end of a shoe on the support to a predetermined operative position adjacent to the toe end of the shoe, a heel lasting unit including heel seat wipers and a heel embracing band mounted on the frame for movement between a retracted position remote from the heel end of a shoe on the support to an operative position with the heel band embracing the heel end of the shoe, power means, power operated means for effecting such movements of said toe lasting unit and said heel lasting unit, power means for operating the toe and heel lasting units, and means for controlling the operation of said power operated means including a manually operable control member and associated control elements adapted, in response to actuation of the manually operable control member by an operator, first to cause said clamping means to operate, next to cause the toe lasting unit to move from its retracted position to its operative position and the heel lasting unit to move from its retracted position to its operative position with the heel band embracing the heel end of the shoe, then to cause the toe and heel lasting units to operate on the toe and heel ends of the shoe, and lastly to cause the toe and heel lasting units to return to their retracted positions and the clamping means to release the shoe form.

13. A machine for lasting the opposite end portions of a shoe having a main frame, a support for a shoe on the frame including a toe rest, a toe lasting unit having a toe band for shaping the upper at the toe end of the shoe in response to heightwise movement of the toe lasting unit relative to the toe end of the shoe, a heel lasting unit, power means for operating said toe lasting unit including a plunger adapted to engage the bottom of the forepart of a shoe on the support above the toe rest and to effect heightwise movement of the toe band relative to the toe end of the shoe, and power means for operating the heel lasting unit.

14. A machine for lasting the opposite end portions of a shoe having a main frame, a support for a shoe on the frame adapted to position the toe end of the shoe in a predetermined location relative to the frame and including a toe rest, a toe lasting unit having a toe band for shaping the upper at the toe end of the shoe in response to heightwise movement of the toe lasting unit relatively to the toe end of the shoe mounted on said frame for movement between a retracted position remote from the toe end of a shoe on the support to a predetermined operative position adjacent to the toe end of a shoe, a heel lasting unit mounted on the frame for movement between a retracted position remote from the heel end of a shoe to an operative position adjacent to the heel end of a shoe, power operated means for effecting such movements of the toe and heel lasting units, power means for operating said toe lasting unit including a plunger adapted to engage the bottom of the forepart of a shoe on the support above the toe rest and to effect heightwise movement of the toe band relative to the toe end of the shoe, power means for operating the heel lasting unit, and means for controlling the operation of said power means including a control member and associated control elements adapted, in response to actuation of the control member, first to cause the toe and heel lasting units to move to their operative positions, then to cause the toe and heel lasting units to operate on the toe and heel ends of the shoe and finally to cause the toe and heel lasting units to return to their retracted positions.

15. A machine for lasting the opposite end portions of a shoe having a main frame, a support for a shoe on the frame adapted to position the toe end of the shoe in a predetermined location relative to the frame and including a toe rest, a toe lasting unit having a toe band for shaping the upper at the toe end of the shoe in response to heightwise movement of the toe lasting unit relative to the toe end of the shoe and wipers for thereafter wiping the lasting margin of the upper materials inwardly over and for pressing it against the toe end of the insole of the shoe mounted on said frame for movement between a retracted position remote from the toe end of a shoe on the support to a predetermined operative position adjacent to the toe end of the shoe, a heel lasting unit mounted on the frame for movement between a retracted position remote from the heel end of the shoe to an operative position adjacent to the heel end of the shoe, power operated means for effecting such movements to the toe and heel lasting units, power means for operating said toe lasting unit including a plunger adapted to engage the bottom of the forepart of a shoe on the support above the toe rest and to effect heightwise movement of the toe band relative to the toe end of the shoe and means for thereafter operating the wipers, power means for operating the heel lasting unit and means for controlling the operation of said power operated means including a control member and associated control elements adapted, in response to actuation of the control member, first to cause the toe and heel lasting units to move to their operative positions, then to cause the toe and heel lasting units to operate on the toe and heel ends of the shoe and finally to cause the toe and heel units to return to their retracted positions.

16. In a machine for lasting the end portions of shoes, a main frame, a support for a shoe on the frame including a toe rest, a toe lasting unit having a toe band for shaping the upper at the toe end of the shoe in response to heightwise movement of the toe lasting unit relative to the toe end of the shoe, and power means for operating the toe lasting unit including a plunger adapted to engage the bottom of the forepart of a shoe on the support above the toe rest and to effect heightwise movement of the toe band relatively to the toe end of the shoe.

17. In a machine for lasting the end portions of shoes, a main frame, a support for a shoe on the frame adapted to position the toe end of the shoe in a predetermined location relative to the frame and including a toe rest, a toe lasting unit having a toe band for shaping the upper at the toe end of the shoe in response to heightwise movement of the toe lasting uint relative to the toe end of the shoe mounted on said frame for movement between a retracted position remote from the toe end of a shoe on the support to an operative position adjacent to the toe end of the shoe, power means for effecting such movements of the toe lasting unit, power means for operating the toe lasting unit including a plunger adapted to engage the bottom of the forepart of a shoe on the support above the toe rest and to effect heightwise movement of the toe band relatively to the toe end of the shoe and means for controlling the operation of said power means including a control member and associated control elements adapted, in response to actuation of the control member, first to cause the toe lasting unit to move to its operative position and then to cause the toe lasting unit to operate on the toe end of the shoe and finally to cause the toe lasting unit to return to its retratced position.

18. In a machine for lastnig the end portions of shoes, a main frame, a support for a shoe on the frame, adapted to position the toe end of a shoe in a predetermined location relative to the frame and including a toe rest, a toe lasting unit having a toe band for shaping the upper at the toe end of the shoe in response to heightwise movement of the toe lasting unit relative to the toe end of the shoe and wipers for thereafter wiping the lasting margin inwardly over and for pressing it against the toe end of the shoe mounted on said frame for movement between a retracted position remote from the toe end of a shoe on the support to an operative position adjacent to the toe end of the shoe, power operated means for effecting such movements of the toe lasting unit, power means for operating the toe lasting unit including a plunger adapted to engage the bottom of the forepart of a shoe on the support above the toe rest and to effect heightwise movement of the toe band relative to the toe end of the shoe, and means for controlling the operation of said power means including a control member and associated control elements adapted, in response to actuation of the control member, first to cause the toe lasting unit to move to its operative position, then to cause the toe lasting unit to operate on the toe end of the shoe and finally to cause the toe lasting unit to return to its retracted position.

References Cited

UNITED STATES PATENTS

| | | | |
|---|---|---|---|
| 238,791 | 3/1881 | Lambert | 12—7 |
| 2,409,193 | 10/1946 | Courchene | 12—8.8 |
| 2,730,733 | 1/1956 | Walsh | 12—14.2 X |
| 3,076,209 | 2/1963 | Gilbride | 12—8.8 |

PATRICK D. LAWSON, *Primary Examiner.*